United States Patent [19]
Liebig et al.

[11] 3,793,892
[45] Feb. 26, 1974

[54] BELLOWS-TYPE DUST BOOT WITH EXPANDABLE SLEEVE

[75] Inventors: Hans-Peter Liebig, Bernhausen; Gunter Umbach, Stuttgart, both of Germany

[73] Assignee: Westinghouse Bremsen-Und Apparatebau GmbH, Hannover, Germany

[22] Filed: Feb. 8, 1973

[21] Appl. No.: 330,584

[52] U.S. Cl.................... 74/18.2, 24/256, 24/262
[51] Int. Cl............................................. F16j 15/32
[58] Field of Search ........ 74/18.2, 18.1, 18; 24/256, 24/262; 292/DIG. 2

[56] References Cited
UNITED STATES PATENTS
3,646,778   3/1972   Fisher ................................ 64/32 R
3,660,213   5/1972   Moseley ............................. 64/32 F Primary Examiner—Benjamin W. Wyche
Assistant Examiner—F. D. Shoemaker
Attorney, Agent, or Firm—R. W. McIntire, Jr., W. F. Poore

[57] ABSTRACT

This invention relates to a bellows-type replaceable dust boot through which extends a brake rod of a tread brake assembly or a brake cylinder. One end of this bellows-type boot is secured in coaxial surrounding relation to a brake rod opening provided in the body of the brake assembly or cylinder by any suitable means. Since a clevis is carried at the exterior end of the brake or piston rod, in order to provide for sliding the other or smaller end of the dust boot over this clevis, the adjacent end of the bellows has integral therewith and extending therefrom a semi-split expandable sleeve for sealing engagement, when assembled and subsequent to the passing therethrough of the clevis, with the peripheral surface of the brake rod. This expandable sleeve comprises a pair of resilient semi-circular members the longitudinally extending adjacent edges of which are integrally connected by a resilient V-shaped foldable member. These V-shaped members are thus expandable to provide for the passage of the smaller end of the dust boot over the clevis. The thickness of one longitudinal edge of each semi-circular member is substantially less than the thickness of the remainder of the member to provide for receiving therein the corresponding resilient V-shaped foldable member which is retained therein by a suitable means such as, for example, a clamp in the form of a thin rectangular metallic strip disposed about the pair of semi-circular members with the opposite ends of this strip secured one to the other by any suitable means.

9 Claims, 3 Drawing Figures

PATENTED FEB 26 1974 3,793,892

BELLOWS-TYPE DUST BOOT WITH EXPANDABLE SLEEVE

BACKGROUND OF THE INVENTION

In order to protect the brake rod opening in the brake rod end of the body of a tread brake assembly or brake cylinder against the entrance of water and other pollutants, and to avoid the malfunctions resulting therefrom, it is a common practice to dispose a bellows or dust boot in surrounding relation to the brake rod and secure the respective opposite ends thereof to the body and the brake rod. The bellows may be provided with a filter to allow the entrance and expulsion of air as the folds of the bellows extend and collapse in response to movement of the brake rod in opposite directions. The respective opposite ends of heretofore known bellows-type dust boots are of different diameters, the larger end being secured to the body in concentric surrounding relation to the brake rod opening therein and the smaller end tightly fitting the peripheral surface of the brake or piston rod.

Since the clevis formed at the exterior end of the brake rod is larger than the smaller end of the dust boot, to slide this smaller end over the clevis after the other end of the brake rod is secured to a piston or other member of the brake actuating mechanism could rupture the smaller end of the boot unless the clevis is separate from the brake rod and screw threaded onto this end of the brake rod subsequent to passing the brake rod through the opening in this smaller end of the dust boot. Such rupturing of the dust boot may be prevented by the use of a split or seam-type boot, the edges of the split seam, subsequent to disposing the boot in surrounding relation to the brake rod, being secured together in a sealed relationship by overlapping and interlocking ribs on the mating edges, or by use of a slide-fastener element, to effectuate the interlocking of the ribs on these mating edges. The provision of either interlocking ribs or a slide-fastener significantly increases the cost of the dust boot and does not positively insure a seal that will prevent the entrance of pollutants to the interior of the brake assembly or cylinder.

Accordingly, it is the general purpose of the present invention to provide a bellows-type dust boot that has integral therewith at one or both ends a semi-split expandable sleeve which can be passed over a clevis carried at the exterior end of a brake or piston rod without damage to the dust boot.

SUMMARY OF THE INVENTION

According to the present invention, a novel bellows-type dust boot is provided wherein the bellows has integral therewith at one or both ends a pair of resilient semi-circular members each having at that end of the semi-circle opposite that of the other a longitudinally extending edge that is substantially less in thickness than the remainder of the member thereby forming a recess for receiving therein one of a pair of thin resilient V-shaped members that respectively integrally connects each pair of adjacent edges of the pair of semi-circular members by having its ends integral therewith when a clamp in the form of a thin rectangular metallic strip is disposed in surrounding relation to these oppositely extending V-shaped members and the opposite ends of this strip moved toward each other until each V-shaped member is folded over and disposed in a corresponding recess, after which these opposite ends are secured one to the other thereby forming a clamp for clamping the interior surface of the pair of semi-circular members against the peripheral surface of the brake or piston rod.

The construction of the dust boot constituting the present invention permits a quicker assembly since the clevis no longer needs to be separate from the brake rod and screw threaded onto the end thereof subsequent to passing this rod through the dust boot but may be formed integral with the brake or piston rod or soldered thereto prior to slipping the dust boot over the clevis.

Two embodiments of the invention will be explained subsequently with reference to the accompanying drawing.

Figure 1:
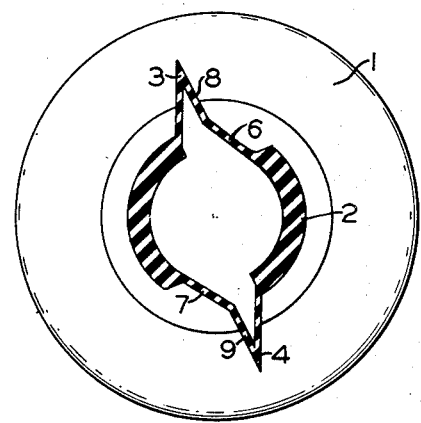
FIG. 1 is a cross-sectional view, taken along the line 1—1 of FIG. 2 and looking in the direction of the arrows, showing a dust boot constructed in accordance with a first embodiment of the invention in which two foldable V-shaped members connect and extend outward from a pair of semi-circular members formed at one end of a bellows.
Figure 2:
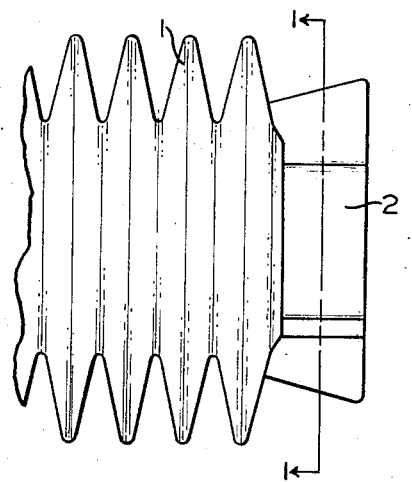
FIG. 2 is a side elevational view of the dust boot shown in FIG. 1.

In the bellows-type dust boot 1 shown in FIG. 1, the folding gasket or semi-split expandable sleeve 2 is arranged concentrically. In the folding gasket or semi-split expandable sleeve 2, two opposite-lying V-shaped folding members 3 and 4 are inserted, when folded, into recesses formed by thin portions 6 and 7 so that the inner folding halves 8 and 9 corresponding to the length of these recesses lie therein.

The sum of the wall thicknesses from a recess to the interior surface of the sleeve and the thickness of the two legs of the V-shaped folding member when folded into a recess correspond substantially to the wall thickness of the remaining part of folding gasket or sleeve 2.

If the folding gasket 2 is conducted or slipped over a clevis on the end of a brake or piston rod, then the foldings or foldable members 3 and 4 pull apart and then assume their original position as shown in FIG. 1, due to their elastic design. Subsequently, these foldable members 3 and 4 are placed about the piston rod with an arbitrary locking device, i.e., with a clamp.

With this arrangement the foldings or foldable members 3 and 4 are pressed into the recesses 6 or 7 so that a uniform thickness of all the folding gaskets is attained.

Figure 3:
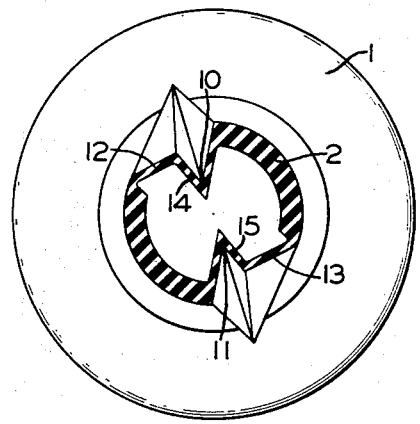
FIG. 3 is a cross-sectional view of a dust boot constructed in accordance with a second embodiment of the invention in which two foldable V-shaped members connect two semi-circular members and extend inward toward the center of these semi-circular members.

FIG. 3 shows a folding gasket 2 with two V-shaped resilient foldable members 10 and 11 having folding halves 14 and 15 pointing towards the interior which have on one side thereof thin portions 12 or 13 that form recesses for receiving these folding halves 14 and 15 in the assembled position.

If the folding gasket is moved over a clevis on the end of a brake or piston rod, then foldable members 10 and 11 separate and the diameter of gasket folding or sleeve 2 expands. After passing over the clevis of the brake or piston rod, the folding gasket automatically places itself in a clamp position about the brake or piston rod due to its elasticity, since the folding gasket 2 makes an effort to assume its original position as shown in FIG. 3, which is, however, prevented by the encircled brake or piston rod.

Having now described the invention, what we claim as new and desire to secure by letters Patent, is:

1. A hollow resilient boot having two opposing ends, wherein the improvement comprises:
   a a semi-split expandable sleeve coaxial with said boot and formed integral with one end thereof.

2. A hollow resilient boot, as recited in claim 1, further characterized by a semi-split expandable sleeve coaxial with said boot and formed integral with the other end thereof.

3. A hollow resilient boot, as claimed in claim 1, further characterized in that said semi-split expandable sleeve comprises:
   a a pair of semi-circular members each having a pair of longitudinally extending parallel edges of unequal thickness, and
   b a pair of resilient V-shaped foldable members, each integrally connecting the thicker edge of one semi-circular member with the thinner edge of the other semi-circular member whereby said semi-circular members form said expandable sleeve.

4. A hollow resilient boot, as claimed in claim 3, further characterized in that said resilient V-shaped foldable members extend, while not folded, in opposite directions away from the center of said expandable sleeve.

5. A hollow resilient boot, as claimed in claim 3, further characterized in that said resilient V-shaped foldable members extend, while not folded, in opposite directions toward the center of said expandable sleeve.

6. A hollow resilient boot, as recited in claim 3, further characterized in that each resilient V-shaped foldable member is foldable into abutting contact with the adjacent one of said thinner edges, whereby said semi-circular members, in cooperation with said V-shaped foldable members while folded into abutting contact with said thinner edges, form said semi-split expandable sleeve.

7. A hollow resilient boot, as claimed in claim 3, further characterized in that each of said resilient V-shaped foldable members comprises a pair of legs, the length of one of said legs being substantially equal to the circumferential length of the thinner of said edges.

8. A hollow resilient boot, as claimed in claim 6, further characterized in that the combined thickness of each thinner edge and a V-shaped foldable member, while folded into abutting contact therewith, is substantially equal to the wall thickness of each of said semi-circular members.

9. A hollow resilient boot, as claimed in claim 7, further characterized in that the thickness of each of said legs is equal to the thickness of said thinner edges.

* * * * *